United States Patent
Lee et al.

(10) Patent No.: US 6,852,413 B2
(45) Date of Patent: Feb. 8, 2005

(54) LYOCELL MULTI-FILAMENT FOR TIRE CORD AND METHOD OF PRODUCING THE SAME

(75) Inventors: Tae-jung Lee, Anyang-si (KR); Soo-myung Choi, Anyang-si (KR); Young-soo Wang, Pusan-kwangyeok-si (KR); Seok-jong Han, Suwon-si (KR); Cheol Kim, Anyang-si (KR); Myung-woo Kim, Masan-si (KR); Ik-hyon Kwon, Seoul (KR); Sung-ryong Kim, Daejeon-kwangyeok-si (KR); Jae-shik Choi, Seoul (KR)

(73) Assignee: Hyosung Corporation, Seoul (KR)

( * ) Notice: Subject to any disclaimer, the term of this patent is extended or adjusted under 35 U.S.C. 154(b) by 0 days.

(21) Appl. No.: 10/735,735

(22) Filed: Dec. 16, 2003

(65) Prior Publication Data

US 2004/0126577 A1 Jul. 1, 2004

(30) Foreign Application Priority Data

Dec. 26, 2002 (KR) .................................... 2002-0084310
Jun. 30, 2003 (KR) .................................... 2003-0043260

(51) Int. Cl.$^7$ .............................. D01F 2/00; B60C 9/08
(52) U.S. Cl. ........................ 428/393; 428/364; 536/56; 536/57; 152/451
(58) Field of Search ............................... 428/364, 393; 152/451; 536/56, 57

(56) References Cited

U.S. PATENT DOCUMENTS

| | | | | |
|---|---|---|---|---|
| 4,416,698 A | * | 11/1983 | McCorsley, III | ......... 106/200.2 |
| 6,013,367 A | * | 1/2000 | Nakagawa et al. | ......... 428/393 |
| 6,701,989 B2 | * | 3/2004 | Choi et al. | .................. 152/451 |

* cited by examiner

*Primary Examiner*—N. Edwards
(74) *Attorney, Agent, or Firm*—Nath & Associates PLLC; Gary M. Nath; Jerald L. Meyer

(57) ABSTRACT

Disclosed is a lyocell multi-filament for a tire cord and a method of producing the same. The method includes i) dissolving mixed powder of cellulose and polyvinyl alcohol in a mixed solvent of N-methyl morpholine N-oxide and water to prepare a dope, ii) extruding the dope using a spinning nozzle including orifices through air gaps into a conical upper coagulation bath to solidify the dope to produce a multi-filament, iii) feeding the multi-filament through a lower coagulation bath to a washing bath, and washing the multi-filament, and iv) drying and oiling the washed multi-filament and winding the resulting multi-filament. At this time, the orifices each have a diameter (D) of 100 to 300 μm, a length (L) of 200 to 2400 μm, and a ratio of the length to the diameter (L/D) of 2 to 8, and are spaced apart from each other at intervals of 2.0 to 5.0 mm. The method provides a lyocell multi-filament having excellent physical properties useful as a tire cord, thereby producing a tire for an automobile having improved driving stability, dimensional stability, and uniformity using the tire cord.

12 Claims, 1 Drawing Sheet

US 6,852,413 B2

LYOCELL MULTI-FILAMENT FOR TIRE CORD AND METHOD OF PRODUCING THE SAME

BACKGROUND OF THE INVENTION

1. Field of the Invention

The present invention pertains to a lyocell multi-filament for a tire cord, a method of producing the same, the tire cord and a tire for an automobile using the same. More particularly, the present invention relates to a lyocell multi-filament for a tire cord, which has excellent physical properties for the tire cord, thereby providing a tire with improved driving stability, dimensional stability, and uniformity for an automobile, a method of producing the same, the tire cord and a tire for an automobile using the same.

2. Description of the Related Art

As well known to those skilled in the art, a material of a tire cord used as a framework constituting a tire is selected from the group consisting of polyester, nylon, aramid, rayon, and steel. In this regard, it is required that the material of the tire cord has the following excellent physical properties: 1) high strength and initial modulus, 2) excellent heat resistance, and no degradation under dry and wet heat, 3) excellent fatigue resistance, 4) excellent dimensional stability, 5) excellent adhesiveness to rubbers (refer to Fukuhara, Fiber & Industry, 1980, Vol. 36, pp 290). However, the above materials cannot have all the above excellent physical properties as described above, so the material of the tire cord depends on the intended use of the tire cord.

For example, a radial tire, requiring excellent initial modulus (elasticity), heat resistance, and dimensional stability, for high-speed driving of an automobile comprises a tire cord mostly consisting of a rayon fiber with low shrinkage and excellent dimensional stability. At this time, the initial modulus is usually expressed as load per unit stretch for a certain fiber denier, in other words, as a slope of an elongation-load curve in a strength and elongation test. The higher the initial modulus of the tire cord is, the less the tire will be deformed, so the high initial modulus contributes to improving fatigue resistance, heat resistance, and durability of the tire. Particularly, the high initial modulus improves transverse-strength of the radial tire, thus excellent driving stability of the radial tire is secured. Additionally, the rayon tire cord has excellent driving stability in comparison with various tire cords consisting of other materials because its physical properties are rarely degraded at a temperature of 80 to 100° C. during driving of the automobile.

However, the rayon tire cord has relatively low tenacity and its modulus is greatly degraded by moisture, so it is difficult to control moisture and quality of the tire during the production of the tire including the rayon tire cord. Additionally, even if the tire including the rayon tire cord is manufactured, when a surface of the tire is damaged and moisture penetrates into the damaged tire, strength and modulus of the tire are reduced, thus being poor in terms of its performance. Accordingly, there is a need to develop a tire cord having excellent strength and modulus against moisture, in addition to having excellent tenacity.

Meanwhile, an artificial lyocell fiber consisting of cellulose is advantageous in that elongation is low and tenacity is high, so its dimensional stability is excellent, and its strength preservation proportion is 80% or higher when the lyocell fiber absorbs water because of its low moisture regain. Accordingly, in comparison with rayon (60%), the lyocell fiber is competitive in terms of low reduction of modulus and low deformation. However, the lyocell fiber has not been used as the tire cord because of the spinning related problems.

A commercial value of fibers used in the tire cord or other industrial materials depends on their physical properties such as tenacity and modulus while the commercial value of fibers for clothes depends on dyeability for vivid or bright colors and ease of care.

Accordingly, each textile maker continuously improves each textile's qualities using various fiber production technologies according to use of the fibers. Various technologies have been developed to improve physical properties of the fibers. For example, when molecular chains constituting a polymer are desirably oriented along a fiber axis, the fibers have excellent physical properties useful to be applied to clothes and various industrial fields. In this regard, orientation is conducted during the drafting process, so the drafting process is one of the most important processes capable of improving physical properties of the fibers.

Furthermore, the drafting process is conducted under a thermoplastic state in which fluidity of molecules is good according to a melt-spinning process. Additionally, according to a solution-spinning process, after a solution including three components, that is, a solvent, a non-solvent, and a polymer is prepared, the solution is spun using a wet spinning or dry spinning method. The drafting process is conducted while vaporizing the solvent in the case of the dry spinning method, but in the case of the wet spinning methods, drafting of the fibers is conducted during the coagulation process, so depending on a concentration and temperature of a coagulation liquid.

Further, in the case of producing the lyocell fiber, when a solution including NMMO (N-methyl morpholine N-oxide), water, and cellulose at relatively high temperature of 80 to 130° C. is spun in such a way that a spinning nozzle is dipped in a coagulation bath according to the traditional wet spinning method, the solution is too quickly coagulated to secure desirable physical properties. Additionally, it is difficult to sufficiently vaporize the solvent from a high viscous cellulose solution of about 10000 poises using only the dry spinning method.

Meanwhile, a dry-wet method may be used to improve physical properties of the fibers and spinning efficiency by properly utilizing air gaps positioned between the spinning nozzle and the coagulation bath.

For example, EP. Pat. A-259,672 discloses a process of producing an aramid fiber, in which the drafting and coagulation process are conducted using air gaps to improve physical properties of the aramid fiber, and U.S. Pat. No. 4,501,886 suggests a process of spinning cellulose triacetate using air gaps. Additionally, Japanese Pat. No. 81,723 by Mitsubishi Rayon Co. describes a high-speed spinning process of a PAN (polyacrylonitrile) fiber using air gaps, East German Pat. No. 218,124 discloses a process of spinning a cellulose solution using a tertiary aminoxide-based aqueous solution, in which air gaps are used to prevent a plurality of filaments from adhering to each other, and U.S. Pat. No. 4,261,943 discloses a process of spraying water acting as a non-solvent to air gaps each having a space of 50 to 300 mm to prevent a plurality of filaments from adhering to each other.

The processes as described above contribute to improving orientation of the fibers using the air gaps. However, they are not useful to be directly applied to the production of a lyocell multi-filament, because filaments are apt to adhere to each other because of a great number of filaments, so desired spinning efficiency is not obtained. As well, the lyocell fiber produced by the above processes has inadequate tenacity and elongation for use as a tire cord.

Further, H. Chanzy et al. (Polymer, 1990 Vol.31, pp 400–405) propose a process of producing a fiber using air gaps, in which salts such as ammonium chloride or calcium chloride are added to a solution of cellulose with the degree of polymerization ($DP_w$) of 5000 in NMMO and the resulting mixture is then spun to produce the fiber with tenacity of 56.7 cN/tex and elongation at break of 4%. However, it is difficult to commercialize this process because of various disadvantages, for example the recovery of the coagulation solution containing salts.

Further, U.S. Pat. No. 5,942,327 describes a process of producing a fiber with tenacity of 50 to 80 cN/tex, elongation of 6 to 25%, and monofilament fineness of 1.5 dtex using air gaps, in which a solution of cellulose with the degree of polymerization ($DP_w$) of 1360 in NMMO hydrate is spun. At this time, the number of filaments of the resulting fiber is just 50 filaments. In general, the filament for a tire cord must have fineness of about 1000 deniers, so hundreds of plies of filaments are needed to secure fineness of about 1000 deniers. Accordingly, this patent is disadvantageous in that it is difficult to secure the tire cord with desired physical properties after twisting or dipping. Practically, it is difficult to control spinning conditions of quenching in the air-gap, washing, and drying of the fiber during spinning of the fiber with large denier in comparison with the spinning process of the fiber with small denier, so rarely securing desired physical properties of the fiber and scarcely maintaining uniformity of the filaments. Accordingly, it is nearly impossible to produce the industrial fiber referring to physical properties of the fiber with 50 filaments. Furthermore, a process of spinning the solution to the air gaps requires a new design accompanying with additional considerations, such as an outer diameter of the spinning nozzle, a diameter of an orifice, intervals between orifices, a length of each of the air gaps, feeding conditions of cooling air, and a drying condition of the filaments depending on a feeding direction of the coagulation liquid and a spinning speed, because adherence of the filaments to each other and quenching efficiency are varied according to an increase of the number of the filaments. In this regard, physical properties of the fiber depend on the design.

Moreover, U.S. Pat. No. 5,252,284 discloses a process of spinning a fiber under conditions of air gaps each having a length within about 10 mm and a winding speed of 45 m/min to produce the fiber consisting of 800 to 1900 filaments. However, this patent is disadvantageous in that elongation is a relatively high 15.4% and tenacity is at most 47.8 cN/tex, thus securing insufficient competitiveness of the fiber for use as a tire cord in terms of tenacity and productivity.

Additionally, some methods of producing a mixture solution of cellulose and polymer using NMMO are known in the art.

For example, U.S. Pat. No. 3,447,939 discloses a process of producing a solution containing cellulose and polyvinyl alcohol dissolved in NMMO, and U.S. Pat. No. 3,508,941 proposes a method of dissolving a mixture of cellulose and polyvinyl alcohol in NMMO to extract the mixture. Further, according to U.S. Pat. No. 4,255,300, when a mixing ratio of cellulose and polyvinyl alcohol is 4:1 to 2:1 and a percent composition ratio of a polymer to a solvent is 20% or lower, a fiber has excellent elongation. However, U.S. Pat. No. 4,255,300 does not disclose the fact that the tenacity of the fiber is improved because polyvinyl alcohol is added to cellulose.

Meanwhile, U.S. Pat. No. 6,245,837 discloses a process of producing a fiber with a tenacity of 27 cN/tex, in which a mixture including cellulose, polyethylene, polyethylene glycol, polymethylmethacrylate, and polyacrylamide is dissolved in a NMMO solution. However, this patent is disadvantageous in that the fiber has very poor tenacity to be used as an industrial filament or a tire cord.

Therefore, there remains a need to develop a cellulose solution for a high strength cellulose filament.

The present inventors have made an effort to develop the cellulose solution for the high strength cellulose filament, and found the fact that a cellulose/polyvinyl alcohol/NMMO solution suppresses the generation of fibril while a cellulose fiber is formed and the cellulose fiber having excellent flexibility and tenacity can be produced using the cellulose/polyvinyl alcohol/NMMO solution, thus the cellulose/polyvinyl alcohol/NMMO solution is usefully applied to an industrial filament or a tire cord.

Furthermore, the present inventors have conducted extensive studies into the method of producing a lyocell filament useful as a tire cord, resulting in the finding that the lyocell multi-filament for tire cords with excellent physical properties can be obtained by providing a method of producing the lyocell multi-filament, comprising the steps of dissolving mixed powder of cellulose and polyvinyl alcohol in a mixed solvent of N-methyl morpholine N-oxide and water to prepare a dope, extruding the dope using a spinning nozzle including orifices through air gaps into a conical upper solidifying bath to solidify the dope to produce a multi-filament, feeding the multi-filament through a lower coagulation bath to a washing bath, washing multi-filament, drying and oiling multi-filament, and winding the resulting multi-filament, thereby accomplishing the present invention.

SUMMARY OF THE INVENTION

Therefore, the present invention has been made keeping in mind the above disadvantages occurring in the prior art, and an object of the present invention is to provide a method of producing a lyocell filament with excellent tenacity and modulus for a tire cord in high yield, thereby producing a tire with improved driving stability, dimensional stability, and uniformity for an automobile.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
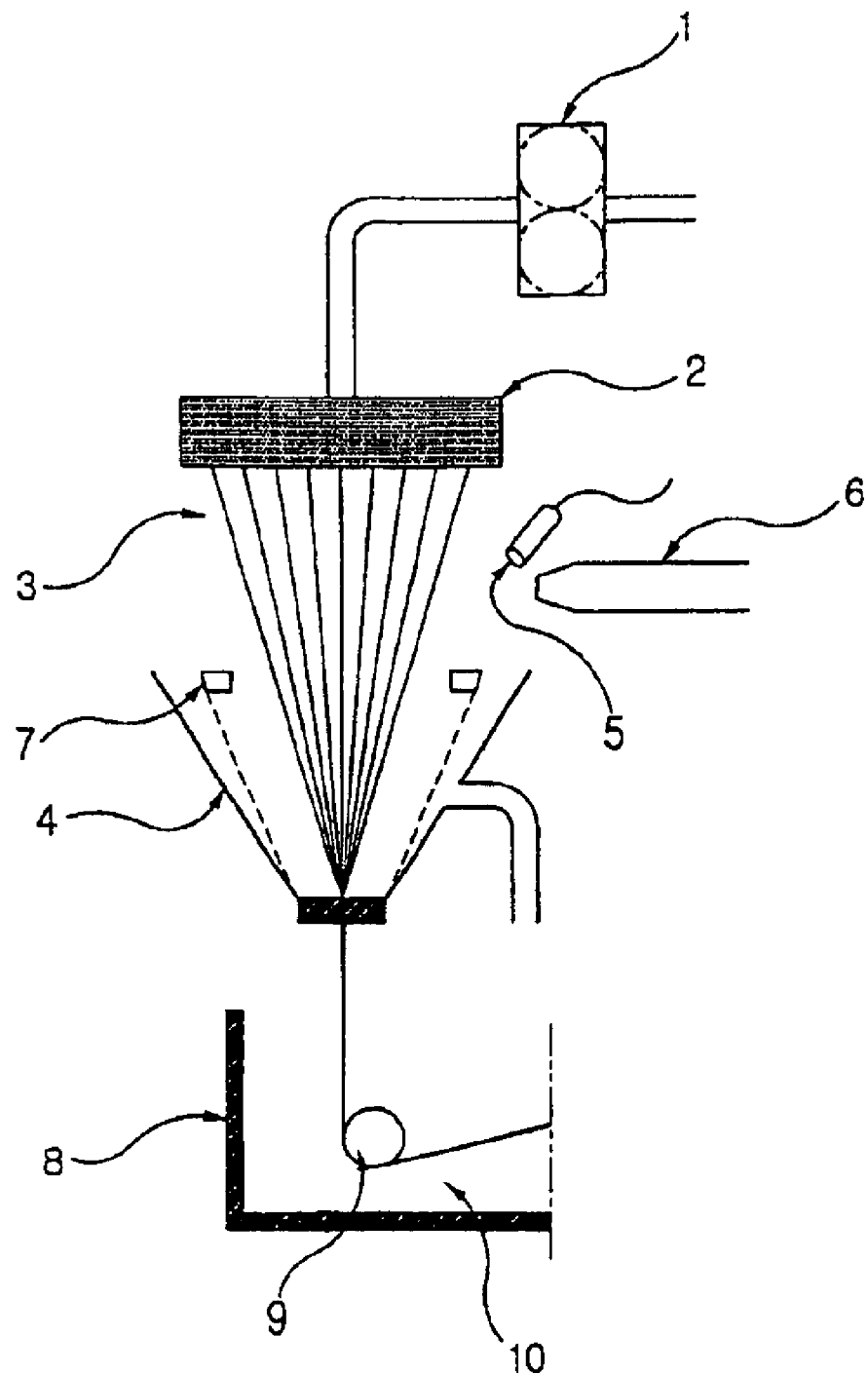
FIG. 1 schematically illustrates the spinning process according to the present invention.

Based on the present invention, the above object can be accomplished by providing a method of producing a lyocell multi-filament for a tire cord, comprising i) dissolving mixed powder of cellulose and polyvinyl alcohol in a mixed solvent of N-methyl morpholine N-oxide (NMMO) and water to prepare a dope, ii) extruding the dope using a spinning nozzle including orifices through air gaps into a conical upper coagulation bath to coagulate the dope to produce a multi-filament, iii) feeding the multi-filament into a lower coagulation bath, changing moving course of the multi-filament to a washing bath, and washing the multi-filament, and iv) drying and oiling multi-filament and winding the resulting multi-filament. At this time, the orifices each have a diameter (D) of 100 to 300 μm, a length (L) of 200 to 2400 μm, and a ratio of the length to the diameter (L/D) of 2 to 8, and are spaced apart from each other at intervals of 2.0 to 5.0 mm.

Additionally, the present invention provides the lyocell multi-filament having fineness of 1000 to 2500 deniers, load at break of 5.0 to 25.0 kg. The lyocell multi-filament consists of 500 to 1500 filaments each having fineness of 0.5 to 4.0 deniers.

Furthermore, the present invention provides a tire cord for an automobile and a tire for an automobile using the lyocell multi-filament.

In the i) step of the method of producing the lyocell multi-filament according to the present invention, mixed powder of cellulose and PVA (polyvinyl alcohol) is dissolved in a mixed solvent of NMMO (N-methyl morpholine N-oxide) and water to prepare a dope.

Further, a pulp with a highly pure cellulose is used so as to produce a lyocell multi-filament for a tire cord according to the present invention. Because lignin has an amorphous structure and hemicellulose has a poor crystalline structure, it is preferable to use the pulp containing a high α-cellulose content and a minimum amount of lignin and hemicellulose so as to produce a high quality cellulose-based fiber. Additionally, the cellulose-based fiber is highly oriented and crystallized using cellulose molecules with the high degree of polymerization, thereby securing excellent physical properties. In this regard, it is preferable to use a soft wood pulp with a degree of polymerization ($DP_w$) of 800 to 1200 containing 93% or higher α-cellulose content.

PVA is added to cellulose during the preparation of the dope so as to produce the desirable lyocell multi-filament for the tire cord according to the present invention, thereby improving fibril resistance, flexibility, and tenacity of the lyocell multi-filament. At this time, PVA functions to reduce viscosity of a cellulose solution to increase fluidity of the cellulose solution to improve homogeneity of the solution. Additionally, the homogeneous cellulose solution contributes to improving spinning efficiency thereof and producing the lyocell multi-filament with excellent physical properties.

Furthermore, useful as a solvent needed during preparing the dope is the mixed solvent of NMMO and water in the present invention, and $NMMO1H_2O$ containing 10 to 20 wt % water, and preferably 13 wt % water is used as NMMO.

Meanwhile, it is necessary to prepare the highly homogeneous and highly concentrated dope while increasing the penetration of the solvent into the mixed powder of cellulose and PVA so as to produce the fiber with excellent physical properties. For this reason, it is needed to secure a device capable of providing high shear stress to the solution and to maintain a temperature of the solution at 80 to 130° C. For example, when the temperature is higher than 130° C., a molecular weight of cellulose is reduced due to the thermal decomposition of cellulose, thus undesirably increasing end groups of molecular chains of cellulose to reduce its physical properties and cause the decomposition of NMMO. On the other hand, when the temperature is lower than 80° C., time and energy consumed to sufficiently dissolve cellulose in the solvent are increased and there is a disadvantage such that a low concentration of cellulose solution must be prepared.

Moreover, it is necessary to uniformly mix cellulose and PVA with liquid NMMO before cellulose is dissolved in the mixed solution of NMMO and water to sufficiently penetrate liquid NMMO into cellulose powder to swell the mixture of cellulose and PVA so as to produce the homogeneous dope without undissolved cellulose particles.

Accordingly, in order to prepare the highly homogeneous cellulose solution, cellulose powder mixed with PVA and the concentrated NMMO liquid are put into a kneader at the same time and all of them are mixed with each other in the kneader. The resulting mixture is repeatedly dispersed, sheared, compressed, drawn, and folded in the kneader to produce a paste of the swollen mixture of cellulose and PVA. The paste thus produced is continuously stuffed into an extruder connected to the kneader and then dissolved in the extruder, thereby accomplishing the highly homogeneous cellulose/PVA dope.

In detail, cellulose powder with an average particle size of 500 μm or smaller is produced by a crusher, and the cellulose powder is mixed with PVA powder having the degree of polymerization of 1000 to 4000 in a powder mixer. The mixed powder of cellulose and PVA contains 0.5 to 30 wt % PVA, and preferably 1 to 10 wt % PVA. When a PVA content in the mixed powder is less than 0.5 wt %, physical properties such as fibril resistance of the fiber become poor. On the other hand, when the PVA content is more than 30 wt %, the PVA is extracted in a coagulation bath after the dope is spun, so undesirably increasing recovery cost of NMMO.

Hereinafter, there will be given a detailed description of the production of the dope. First of all, 50 wt % NMMO aqueous solution is concentrated to prepare the NMMO aqueous solution containing 10 to 20 wt % water, and poured in conjunction with the mixed powder of cellulose and PVA into the kneader. At this time, NMMO functions to swell the mixed powder, and is maintained to 70 to 100° C., and preferably 80 to 90° C. in terms of temperature during feeding NMMO into the kneader. The mixed powder and concentrated NMMO are injected into the kneader at 65 to 90° C., and preferably 75 to 80° C. to produce the resulting mixture, and the resulting mixture contains 5 to 20 wt % mixed powder of cellulose and PVA, and preferably 9 to 14 wt % mixed powder according to the degree of polymerization of cellulose. The mixed powder of cellulose and PVA and liquid NMMO are repeatedly compressed, drawn, folded, and sheared in the kneader to produce the homogeneous cellulose/PVA paste, and the paste thus produced is fed into the extruder while being maintained at 75 to 80° C. The paste is melted in the extruder at 85 to 105° C. to accomplish the dope.

Furthermore, in the ii) step of the method of producing the lyocell multi-filament according to the present invention, the dope is extruded through a spinning nozzle including a plurality of orifices, reaches a conical upper coagulation bath through air gaps between the fillaments, and is solidified to obtain the multi-filament. At this time, each of the orifices has a diameter (D) of 100 to 300 μm, a length (L) of 200 to 2400 μm, and a ratio of the length to the diameter (L/D) of 2 to 8, and an interval between adjacent orifices is 2.0 to 5.0 mm.

FIG. 1 schematically illustrates the spinning process according to the present invention. With reference to FIG. 1, the cellulose solution is quantitatively fed from a gear pump 1 through the spinning nozzle 2 and air gaps 3 to a surface of a coagulation liquid. The spinning nozzle 2 has a circular cross-section, and a diameter of 50 to 160 mm, preferably 80 to 130 mm. When the diameter of the spinning nozzle 2 is smaller than 50 mm, cooling efficiency of the cellulose solution is reduced and the partially solidified cellulose filaments are attached to each other because intervals between the orifices are very short. On the other hand, when the diameter is larger than 160 mm, auxiliary devices such as a spinning pack and the spinning nozzle become undesirably large. Moreover, when the diameter of each of the orifices is smaller than 100 μm, yarn breaking occurs during spinning the cellulose solution to reduce spinning efficiency, but when the diameter of each orifice is larger than 300 μm, a solidifying speed of the cellulose solution in the coagulation bath is slow and it is difficult to wash the multi-filament to remove NMMO. Additionally, when the length of each orifice is shorter than 200 μm, orientation of the cellulose solution becomes poor to degrade physical properties of the multi-filament. On the other hand, when the length is longer than 2400 μm, great expense and effort are undesirably required to produce the orifices.

Meanwhile, the number of orifices is 500 to 1500, and preferably 800 to 1200 because the multi-filament is industrially used as a tire cord and the cellulose solution must be uniformly cooled. Efforts have been made to develop industrial lyocell fibers, but the lyocell multi-filament with high tenacity for tire cords have not yet been developed because it is difficult to secure excellent spinning efficiency and sophisticated technologies are needed due to the great number of filaments. To avoid the above disadvantages, the spinning nozzle 2 including the above desirable number of orifices is used in the present invention. When the number of orifices is less than 500, fineness of each filament becomes large, so NMMO is not sufficiently removed from the filaments for a short time to cause incomplete solidification and washing of the filaments. On the other hand, when the number of orifices is more than 1500, the adjacent filaments are attached to each other in the air gaps and stability of each of the filaments is reduced, thus physical properties of the multi-filament are degraded, and some problems may occur in the twisting and heat-treatment process which are processes required to apply the multi-filament to tire cords.

Additionally, when the dope passing through the spinning nozzle 2 is solidified in the upper coagulation liquid, it is difficult to obtain the multi-filament with a dense and homogeneous structure because a surface and an interior of a thick strand of the solidified dope have different solidifying rates. Accordingly, the cellulose solution, that is, the dope, is spun through the air gaps 3 with desirable space to produce fine fibers in the coagulation liquid. When the thickness of each of the air gaps is thin, the surface solidification of the spun dope is quickly conducted and occurrence of micropores in the multi-filament is increased in the solvent-removing process to prevent a draw ratio from being increased and reduce a spinning speed. On the other hand, when the thickness of each of the air gaps is thick, the filaments are attached to each other and affected by a temperature and humidity of each air gap, thus the production of the multi-filament is unstable. Hence, the width of the air gap is preferably 20 to 300 mm, and more preferably 30 to 200 mm.

When the dope passes through the air gaps 3, quenching air is supplied to the filaments so as to properly cool the filaments to prevent them from being melted and attached to each other and to increase dipping resistance of the filaments to the coagulation liquid. Additionally, a sensor 5 is installed between a quenching air supplier 6 and the filaments to monitor the temperature and humidity of the air gaps and control them. The cooling air is preferably maintained at 5 to 20° C. For example, when a temperature of the cooling air is lower than 5° C., the solidification of the filaments is quickly promoted, so the high-speed spinning process is not feasible. But, when the temperature is higher than 20° C., yarn breaking may occur because dipping resistance of the filaments to the coagulation liquid is reduced.

Moreover, a moisture content in the cooling air affects the solidification of the filaments, and relative humidity (RH) in the air gaps 3 is preferably 10 to 50%. In detail, dry air with relative humidity (RH) of 10 to 30% is supplied near the spinning nozzle and wet air with relative humidity (RH) of 30 to 50% is supplied near the coagulation liquid so as to improve a solidification speed of the filaments and prevent the filaments from attaching to a surface of the spinning nozzle. The cooling air is supplied to the filaments in such a way that it flows in parallel with surfaces of the vertically moving filaments. At this time, a flowing speed of the cooling air is preferably 1 to 10 m/sec, and more preferably 2 to 7 m/sec. When the flowing speed is less than 1 m/sec, the cooling air does not sufficiently affect the filaments, a portion of each of the filaments which the cooling air reaches late is different from another portion of each of the filaments which the cooling air reaches early in terms of the solidifying speed, and yarn breaking occurs, thereby the homogeneous filaments being rarely produced. On the other hand, when the flowing speed is more than 10 m/sec, the filaments vibrate, so the filaments may be attached to each other and spinning stability of the filaments is not secured because the dope is not uniformly spun.

As for a composition in the upper solidifying bath according to the present invention, it is preferable that a concentration of NMMO in water in the upper coagulation bath is 5 to 20%.

When the filaments pass through the upper coagulation bath 4, if the spinning speed is increased by 50 m/min or more, the coagulation liquid seethes due to friction between the filaments and the coagulation liquid. This phenomenon functions to reduce stability of the production of the multi-filament when physical properties of the multi-filament and the spinning speed are improved by drawing the multi-filament to improve productivity of the multi-filament. Accordingly, a doughnut-shaped mesh net 7 is installed on the upper coagulation bath 4 to cause the solidifying liquid to flow in the same direction as movement of the filaments to spontaneously draw and orient the multi-filament.

Furthermore, in the iii) step of the method of producing the lyocell multi-filament according to the present invention, the multi-filament is fed through a lower coagulation bath 8 to a washing bath. In detail, the lower coagulation bath 8 functions to recover the coagulation liquid 10 flowing down along the filaments discharged from the upper coagulation bath 4, and a roller 9 installed in the lower coagulation bath 8 functions to change the moving direction of the filaments. Additionally, the roller 9 rotates so as to reduce frictional resistance of the roller 9 to the filaments. Furthermore, a control bath is separately installed so as to control a concentration of the coagulation liquid in the upper coagulation bath 4 in such a way that it is the same as a concentration of the coagulation liquid in the lower coagulation bath 8 or a difference between concentrations of the upper and lower coagulation bath 4 and 8 is within 0.5%. In this regard, a temperature and concentration of the coagulation liquid must be constant because the solvent removing and drawing processes which seriously affect physical properties of the filaments are simultaneously conducted when the filaments pass through the upper and lower coagulation bath 4 and 8. The filaments passing through the lower coagulation bath are rinsed in the rinsing bath. At this time, the filaments are rinsed according to a traditional rinsing process.

Moreover, in the iv) step of the method of producing the lyocell multi-filament according to the present invention, the washed multi-filament is dried, oiled, and wound according to a traditional process, thereby accomplishing an industrial filament for tire cords.

The lyocell multi-filament according to the present invention has fineness of 1000 to 2500 deniers and load at break of 5.0 to 25.0 kg. Further, the multi-filament consists of 500 to 1500 filaments each having fineness of 0.5 to 4.0 deniers. Additionally, the multi-filament has tenacity of 5 to 10 g/d, elongation of 3 to 13%, modulus of 200 to 400 g/d, birefringence of 0.038 to 0.050, crystallinity of 40 to 51%, shrinkage of −0.5 to 3%, and strength maintenance of 90% or more after the heat and saturated vapor treatment at a high temperature, thereby being usefully applied to the tire cord for an automobile.

According to the present invention, disadvantages occurring in the method of producing the lyocell multi-filament using a wet spinning process are desirably overcome, and the maximum spinning speed is 250 m/min. That is to say, even though the number of orifices of the spinning nozzle is large, the homogeneous cellulose solution and the cooling air with desirable temperature and humidity are used, so spinning efficiency is excellent and friction between the filaments and the solidifying liquid in the solidifying bath is reduced, thereby accomplishing the high-speed spinning process.

A better understanding of the present invention may be obtained by reading the following examples which are set forth to illustrate, but are not to be construed to limit the present invention.

Dopes and lyocell multi-filaments produced according to examples and comparative examples as will be described below are evaluated as follows:

(a) Degree of Polymerization ($DP_w$)

An intrinsic viscosity (IV) of cellulose dissolved in a solvent was obtained at 25±0.01° C. within a concentration range of 0.1 to 0.6 g/dl by a Ubbelohde viscometer using a 0.5M cupriethylenediamine hydroxide solution prepared according to ASTM D539-51T. At this time, the intrinsic viscosity was obtained by extrapolating a specific viscosity against the concentration, and the intrinsic viscosity thus obtained was substituted for the Mark-Houwink's equation, as will be described below, to obtain a degree of polymerization.

$$[IV]=0.98\times10^{-2}DP_w^{0.9}$$

(b) Attachment of the Filaments

Filament was repeatedly cut to lengths of 1 m, and the cut yarn with a length of 1 m was cut again to produce a sample with a length of 0.1 m. The above procedure was repeated so as to produce five samples. The samples thus produced were dried at 107° C. for 2 hours without load, and then observed by naked eye using an Image Analyzer to determine whether the filaments were attached to each other or not. If any attachment between the filaments was found, the filament was evaluated as "fail (F)", but if no attachment is found, it was evaluated as "pass (P)".

(c) Strength (kgf) and Elongation at Specific Load (%)

After the samples were dried at 107° C. for 2 hours, strength and elongation of each sample with a length of 250 mm were measured using a low-speed elongation type of tensile strength tester manufactured by Instron Co. at a tension speed of 300 m/min and at 80 TPM (twist/m). At this time, elongation at specific load is measured as elongation at load of 4.5 kg.

(d) Shrinkage (%)

After each sample was left at a temperature of 25° C. and a relative humidity of 65% for 24 hours, a first length ($L_0$) of each of the samples measured at a load of 20 g and a second length ($L_1$) of each of the samples measured after being treated at the load of 20 g at 15° C. for 30 minutes were used to calculate shrinkage of each sample by the following equation.

$$S(\%)=(L_0-L_1)/L_0\times100$$

(e) Birefringence

Birefringence of each sample was measured using a polarization microscope adopting a Na-D light source and a Berek compensator.

(f) Crystallinity

Crystallinity of each sample was assessed using a wide angle X-ray diffractometer (manufactured by Ricaku Co., X-ray source: CuKa (Ni filter), output: 50 KV and 200 mA, and angle range: $2\theta=5$ to $45°$)

(g) Strength Maintenance After the Saturated Vapor Treatment

After exposed to high temperature and moisture, each sample was left in an autoclave (manufactured by the present inventors) at 170° C. for 10 min under a saturated vapor atmosphere so as to evaluate its shape and physical property stability. The resulting sample was then dried to measure its strength, and a ratio of the measurements of the strength before and after the saturated vapor treatment was calculated to evaluate the strength maintenance of each sample.

EXAMPLE 1

Mixed powder in which pulp with the degree of polymerization ($DP_w$) of 1200 containing a α-cellulose content of 97% is mixed with PVA in a weight ratio of 20:1, NMMO.1H$_2$O, and 0.01 wt % propyl gallate were mixed to produce an 11.5% cellulose solution. Spinning nozzles with a diameter of 120 mm including 800, 1000, and 1200 orifices were used to extrude the cellulose solution. At this time, a diameter of each of the orifices was 150 μm, and a ratio of a length to the diameter (L/D) of each orifice was 4 for all the spinning nozzles. When the cellulose solution (head temperature: 110° C.) passed through the spinning nozzle flew through air gaps at a point spaced apart from the spinning nozzle by 50 mm, cooling air with a temperature of 20° C. and relative humidity of 40% blew at a speed of 4 m/sec to the solution, and an extruding amount and spinning speed of the solution were controlled in such a way that fineness of the resulting multi-filament was 1500 to 2000 deniers. A temperature of a coagulation liquid was 20° C. and the coagulation liquid contained 20% NMMO and 80% water, and the coagulation liquid circulated between an upper and a lower coagulation bath. At this time, a temperature of the cooling air and a concentration of the coagulation liquid were continuously monitored using a sensor and a refractometer. NMMO remaining on the multi-filament discharged from the upper and lower coagulation bath was rinsed, and the washed multi-filament was dried and wound. Physical properties of the multi-filament are described in Table 1.

TABLE 1

| | Example 1 | | | | |
|---|---|---|---|---|---|
| Spinning conditions | 1-1 | 1-2 | 1-3 | 1-4 | 1-5 |
| Nozzle diameter (mm) | 120 | 120 | 120 | 120 | 120 |
| Number of orifices | 800 | 1000 | 1200 | 1000 | 1000 |
| Orifice diameter ($\mu$m) | 150 | 150 | 150 | 150 | 150 |
| Fineness of multi-filament (d) | 1510 | 1508 | 1502 | 1720 | 2000 |
| [1]Physical properties | | | | | |
| Attachment | Pass | Pass | Pass | Pass | Pass |
| Tenacity (g/d) | 6.5 | 7.7 | 9.4 | 7.5 | 5.7 |
| Elongation at specific load (%) | 2.1 | 1.9 | 1.1 | 1.9 | 2.7 |
| Elongation at break (%) | 8.4 | 6.7 | 3.9 | 9.7 | 12.5 |
| Modulus (g/d) | 230 | 270 | 350 | 280 | 205 |
| Crystallinity (%) | 44 | 48 | 51 | 50 | 42 |
| Birefringence ($\Delta n \times 10^3$) | 0.043 | 0.046 | 0.048 | 0.049 | 0.042 |
| [2]Strength maintenance (%) | 93 | 94 | 92 | 95 | 95 |

[1]Physical properties: physical properties of the multi-filament
[2]Strength maintenance: Strength maintenance after the saturated vapor treatment From the Table 1, it can be seen that the number of the orifices rarely affects spinning efficiency of the cellulose solution, and when the number of the orifices is slightly increased, tenacity is increased and elongations at specific load and at break are decreased. As for modulus, it is the highest when the number of the orifices is 1200. When the extruding amount and spinning speed are controlled in such a way that fineness of the multi-filament is 1500 to 2000, attachment of the filaments to each other is scarcely affected. Additionally, tenacity is reduced but elongation is apt to be increased with an increase of fineness of the multi-filament.

EXAMPLE 2

First mixed powder in which pulp with the degree of polymerization ($DP_w$) of 800 containing a $\alpha$-cellulose content of 97% is mixed with PVA in a weight ratio of 20:1, second mixed powder in which pulp with the degree of polymerization ($DP_w$) of 1200 containing a $\alpha$-cellulose content of 97% is mixed with PVA in a weight ratio of 20:1, NMMO.1H$_2$O, and 0.01 wt % propyl gallate were mixed to produce two different cellulose solution samples. In this regard, a concentration of the cellulose solution including the pulp with the degree of polymerization of 800 was 13.5%, and that of the cellulose solution including the pulp with the degree of polymerization of 1200 was 11.5%. Spinning nozzles with a diameter of 120 mm including 1000 orifices with three types of diameters of 120, 150, and 200 $\mu$m were used to extrude the cellulose solution. At this time, a ratio of a length to the diameter (L/D) of each orifice was 5 for all the spinning nozzles. Cooling air was fed to air gaps according to the same procedure as the example 1, and an extruding amount and spinning speed of the solution were controlled in such a way that fineness of the resulting multi-filament was 1500 deniers. Subsequently, the cellulose solution passed through a coagulation liquid, was washed, dried, and wound to accomplish the multi-filament. Physical properties of the multi-filament are described in Table 2.

As described above, the spinning nozzle including 1000 orifices was used, and the pulps each having the degree of polymerization ($DP_w$) of 800 and 1200 were used to produce the multi-filament and dip cord in example 2. From the Table 2, it can be seen that tenacity is apt to be increased with an increase of the diameter of the orifice, and much more increased in the case of using the pulp with DPw of 800 than in the case of using the pulp with DPw of 1200. Additionally, elongation is reduced but modulus is increased in accordance with an increase of the diameter of the orifice. Further, tenacity and modulus are highest when the degree of polymerization of the pulp is 1200 and the diameter of the orifice is 200.

COMPARATIVE EXAMPLE 1

An 11.5% cellulose solution was produced using a mixture of pulp with the degree of polymerization ($DP_w$) of 1200 containing a $\alpha$-cellulose content of 97%, NMMO.1H$_2$O, and 0.01 wt % propyl gallate without PVA. Spinning nozzles with a diameter of 120 mm including 1000 orifices with two types of diameters of 120 and 150 $\mu$m were used to extrude the cellulose solution. At this time, a ratio of a length to the diameter (L/D) of each orifice was 5 for all the spinning nozzles. Cooling air was fed to air gaps according to the same procedure as the example 1, and an extruding amount and spinning speed of the solution were controlled in such a way that fineness of the resulting multi-filament was 1500 deniers. Subsequently, the cellulose solution passed through a coagulating liquid, was washed, dried, and wound to accomplish the multi-filament. Physical properties of the multi-filament are described in Table 2.

TABLE 2

| | Example 2 | | | | | | Comp. Ex. 1 | |
|---|---|---|---|---|---|---|---|---|
| Spinning conditions | 2-1 | 2-2 | 2-3 | 2-4 | 2-5 | 2-6 | 1-1 | 1-2 |
| $DP_w$ of cellulose | 800 | 800 | 800 | 1200 | 1200 | 1200 | 1200 | 1200 |

TABLE 2-continued

|  | Example 2 |  |  |  |  |  | Comp. Ex. 1 |  |
|---|---|---|---|---|---|---|---|---|
| [1]Con. of cellulose (%) | 13.5 | 13.5 | 13.5 | 11.5 | 11.5 | 11.5 | 11.5 | 11.5 |
| Orifice diameter ($\mu$m) | 120 | 150 | 200 | 120 | 150 | 200 | 120 | 150 |
| [2]Fineness (d) | 1510 | 1505 | 1511 | 1500 | 1508 | 1507 | 1502 | 1505 |
| [3]Physical properties | | | | | | | | |
| Attachment | Pass | Pass | Pass | Pass | Pass | Pass | Pass | Pass |
| Tenacity (g/d) | 5.7 | 6.3 | 7.5 | 7.9 | 9.4 | 9.7 | 4.5 | 4.8 |
| [4]Elongation (%) | 2.9 | 1.6 | 1.0 | 1.2 | 1.1 | 1.0 | 2.5 | 2.7 |
| Elongation at break (%) | 7.2 | 5.8 | 4.9 | 7.5 | 3.9 | 3.8 | 8.7 | 6.9 |
| Modulus (g/d) | 210 | 247 | 266 | 280 | 330 | 368 | 173 | 188 |
| Crystallinity (%) | 48 | 48 | 49 | 50 | 50 | 51 | 38 | 39 |
| Birefringence ($\Delta n \times 10^3$) | 0.045 | 0.045 | 0.042 | 0.048 | 0.049 | 0.049 | 0.037 | 0.037 |
| [5]Strength maintenance (%) | 93 | 94 | 92 | 92 | 95 | 98 | 84 | 88 |

[1]Con. of cellulose (%): Concentration of cellulose.
[2]Fineness (d): Fineness of multi-filament
[3]Physical properties: physical properties of the multi-filament
[4]Elongation (%): Elongation at specific load (%)
[5]Strength maintenance: Strength maintenance after the saturated vapor treatment

COMPARATIVE EXAMPLE 2

The cellulose solution was produced according to the same procedure as comparative example 1, and the physical properties of the multi-filament were estimated while varying the number of orifices each having a diameter of 150 $\mu$m. When the number of orifices is 400, the spinning efficiency is not poor but draft (ratio of winding speed of the multi-filament/extruding speed of the cellulose solution) is reduced because an extruding speed of the solution was much faster than a winding speed of the multi-filament, thereby reducing tenacity.

When the number of the orifices is 1000 and fineness of the multi-filament is 800 and 2300 denier, physical properties of the multi-filament and dip cord are described in Table 3. If fineness of the multi-filament is 800 denier, strength is too poor to apply the multi-filament to a tire cord. The multi-filament with fineness of 2300 denier is not useful to be applied to the tire cord because of excessively high fineness. Furthermore, the spinning nozzles including orifices having diameters of 90 and 350 $\mu$m are insufficiently competitive in terms of spinning efficiency, causing yarn breaking. Particularly, when the diameter of the orifice is 350 $\mu$m, most of filaments are attached to each other, thereby greatly reducing the physical properties of the multi-filament.

TABLE 3

|  | Comparative Example 2 |  |  |  |  |  |
|---|---|---|---|---|---|---|
| Spinning conditions | 2-1 | 2-2 | 2-3 | 2-4 | 2-5 | 2-6 |
| $DP_w$ of cellulose | 1200 | 1200 | 1200 | 1200 | 1200 | 1200 |
| Orifice diameter ($\mu$m) | 150 | 150 | 150 | 90 | 350 | 150 |
| Number of orifices | 400 | 1000 | 1000 | 1000 | 1000 | 1000 |
| Fineness of multi-filament | 1503 | 800 | 2300 | 1511 | 1510 | 1508 |
| [1]Physical properties | | | | | | |
| Attachment | F | F | F | F | F | Pass |
| Tenacity(g/d) | 4.9 | 4.1 | 4.8 | 2.9 | 4.2 | 4.7 |
| Elongation at specific load (%) | 2.1 | 1.6 | 1.3 | 1.5 | 1.9 | 1.1 |
| Elongation at break (%) | 6.5 | 3.4 | 9.1 | 6.0 | 6.3 | 5.3 |
| Modulus (g/d) | 173 | 169 | 174 | 119 | 170 | 177 |
| Crystallinity (%) | 39 | 36 | 39 | 34 | 36 | 36 |
| Birefringence ($\Delta n \times 10^3$) | 0.044 | 0.044 | 0.042 | 0.045 | 0.039 | 0.044 |
| [2]Strength maintenance (%) | 88 | 89 | 87 | 80 | 85 | 88 |

[1]Physical properties: physical properties of the multi-filament
[2]Strength maintenance: Strength maintenance after the saturated vapor treatment Therefore, the present invention provides a lyocell multi-filament having excellent physical properties useful as a tire cord, thereby producing a tire for an automobile having improved driving stability, dimensional stability, and uniformity using the tire cord.

The present invention has been described in an illustrative method, and it is to be understood that the terminology used is intended to be in the nature of description rather than of limitation. Many modifications and variations of the present invention are possible in light of the above teachings.

Therefore, it is to be understood that within the scope of the appended claims, the invention may be practiced otherwise than as specifically described.

What is claimed is:

1. A lyocell multi-filament having tenacity of 5 to 10 g/d, elongation of 3 to 13%, modulus of 200 to 400 g/d, birefringence of 0.038 to 0.050, crystallinity of 40 to 52%, shrinkage of −0.5 to 3%, strength maintenance after a high temperature and saturated vapor treatment of 90% or higher, and fineness of 1000 to 2500 deniers.

2. The lyocell multi-filament as set forth in claim 1, wherein elongation is 0.5 to 4.0% at a load of 4.5 kg.

3. The lyocell multi-filament as set forth in claim 1, wherein a load at break is 5.0 to 25.0 kg.

4. A tire cord comprising the lyocell multi-filament according to claim 1.

5. A dip cord for tire cords produced using the tire cord according to claim 4.

6. The dip cord as set forth in claim 5, having fineness of 3000 to 6000 deniers, twist constant of 0.67 to 0.85, and a load at break of 14.0 to 28.0 kg.

7. A tire for automobiles comprising the lyocell multi-filament according to claim 1.

8. A tire comprising the dip cord according to claim 5.

9. A tire cord comprising the lyocell multi-filament according to claim 2.

10. A tire cord comprising the lyocell multi-filament according claim 3.

11. A tire for automobiles comprising the lyocell multi-filament according to claim 2.

12. A tire for automobiles comprising the lyocell multi-filament according to claim 3.

* * * * *